United States Patent [19]

Zarotti

[11] Patent Number: 5,119,856

[45] Date of Patent: Jun. 9, 1992

[54] PNEUMATIC TIRE WHEEL HAVING A DEFORMABLE BLADDER FOR ADJUSTING THE INFLATION PRESSURE OF SAID PNEUMATIC TIRE WHEEL

[75] Inventor: Claudio Zarotti, Milan, Italy

[73] Assignee: Vela S.r.l., Milan, Italy

[21] Appl. No.: 256,956

[22] Filed: Oct. 13, 1988

[30] Foreign Application Priority Data

Oct. 14, 1987 [IT] Italy .................. 22271 A/87

[51] Int. Cl.$^5$ .................... B60C 23/10; B60C 5/00
[52] U.S. Cl. ...................... 152/415; 152/510
[58] Field of Search ................ 152/331.1, 336.1, 317, 152/415, 416, 417, 418, DIG. 5, 506, 510, 152, 153, 158; 141/38

[56] References Cited

U.S. PATENT DOCUMENTS 4,169,497 10/1979 Tsuruta ........................ 152/418
4,343,338 8/1982 Hart ............................ 152/417

Primary Examiner—Michael W. Ball
Assistant Examiner—Gregory J. Wilber
Attorney, Agent, or Firm—Sughrue, Mion, Zinn, Macpeak & Seas

[57] ABSTRACT

Inside a tight sealed chamber defined between a rim and a tire of a pneumatic tire wheel for vehicles, there is provided a predetermined amount of a two-phase system in a substantially balanced state at the tire temperature and inflation pressure. The two-phase system comprises a liquid in a balanced state with its own vapor contained within a sealed, elastically deformable toric bladder which is mounted to the rim. By changing the amount of heat in the two-phase system so as to change its balance condition, a variation is obtained in the inflation pressure of the tire.

9 Claims, 4 Drawing Sheets

PNEUMATIC TIRE WHEEL HAVING A DEFORMABLE BLADDER FOR ADJUSTING THE INFLATION PRESSURE OF SAID PNEUMATIC TIRE WHEEL

BACKGROUND OF THE INVENTION

This invention has for its subject a pneumatic tire wheel for vehicles comprising a pneumatic tire so mounted to a tire rim as to define a tight sealed chamber for inflating said tire, and a predetermined amount of a two-phase system in a substantially saturated vapor balance state at the temperature and inflation pressure of said tire and introduced into said tight chamber. The invention is also concerned with a method of adjusting the inflation pressure of a pneumatic tire of the kind specified above.

In the technical field of pneumatic tires for vehicles, there are two major requirements to be met. Firstly, the tire should be prevented from deflating rapidly on the occurrence of a tire blowout or puncture; secondly, the inflation pressure of pneumatic tires should be made adjustable in as automated a manner as possible even with the vehicle running.

To meet the first-noted requirement, the prior art provides pneumatic tires with inflation chambers into which substances can be introduced or released which can stop any minor leaks developed in the tire while the vehicle is running. Examples of such wheels are disclosed in U.S. Pat. Nos. 3,910,334 and 4,130,144.

However, proper performance of the measures described therein is subordinate to the tire becoming at least partly deflated, and is limited to but very small leaks.

Accordingly, such prior measures cannot perform successfully during the initial stage of the tire deflation, irrespectively of how fast the deflation rate may be, and may prove inadequate even during the final deflation stage if the leak is a serious one.

Inasmuch as, from the standpoint of safety, preventing the tire from deflating at such a fast rate as to cause sudden and uncontrollable skidding of the vehicle has priority of concern over preventing the tire from reaching a flat condition, the measures provided by the prior art cannot be regarded as fully satisfactory.

An improvement in this technology is disclosed by Italian Patent No. 1054139, filed on Jul. 30, 1973 in the name of Dunlop Ltd. This prior patent provides for the leak stopping substances to be additivated with a volatile liquid mixture susceptible to be vaporized by the heat generated within the tire as a result of its running in a deflated condition.

Such volatile liquids are effective to create within the punctured tire pressure conditions which are acceptable at least for short distance running. The effect is brought about, of course, by the leak being stopped by the leak stopping substances.

A first technical solution proposed is of introducing that mixture of liquids in a free state unrestrictedly into the tire inflation chamber. It is recognized, however, in the patent itself, that such an approach results unavoidably in the wheel balance being affected. Alternatively, it is suggested that the mixture be stored in a purposely provided means and released into the inflation chamber on the tire deflating.

Thus, having rejected the use of free liquids in the inflation chamber, also the measures suggested in that patent can only become effective after the punctured tire has become fully deflated.

The second-mentioned requirement in the foregoing is expressed by the improved performance of wheels, in terms of traction, tire wear, travel speed, and distribution of the load over a yielding roadbed, in dependence on the inflation pressure.

As is known, for instance, in driving from an asphalt course to a sandy, muddy, snow-covered, or otherwise yielding surface, it is highly recommended that the inflation pressure of the wheel tires be decreased to enhance the tire traction and bearing surface on the ground. This is a need which is felt particularly by military, agricultural, and racing vehicles, on account of such vehicles being liable to encounter frequent changes in the nature of the roadbed.

To fill this demand, the prior art proposes complex vehicle-mounted systems whereby compressed air can be supplied to the inflation chamber of each tire even while the vehicle is running. Such systems generally include compressed air ducts which extend through the wheel hubs.

Typical examples of such prior devices are described in European Patents Nos. 0071278 and 164917.

Additionally to their highly complex construction, a major drawback of such systems is that a satisfactory seal is difficult to accomplish at the rotary fits provided in the duct paths through the wheel hub.

Such drawbacks have largely frustrated even small-scale attempts to install such systems on vehicles for normal use. Further, the components of said systems considerably burden the vehicle weight and cost.

SUMMARY OF THE INVENTION

The problem that underlies this invention is to provide a pneumatic tire wheel designed to obviate the cited drawbacks of the prior art.

This problem is solved according to the invention by the provision of a pneumatic tire wheel of the type specified in the introductory part of this specification being characterized in that the two-phase system is contained within at least one sealed, elastically deformable toric bladder mounted to the rim of said tire wheel,

BRIEF DESCRIPTION OF THE DRAWINGS

The invention features and advantages will be more clearly understood from the following detailed description of a preferred, but not exclusive, embodiment thereof, to be taken in conjunction with the accompanying drawings, where.

DETAILED DESCRIPTION OF THE DRAWINGS

Figure 1:
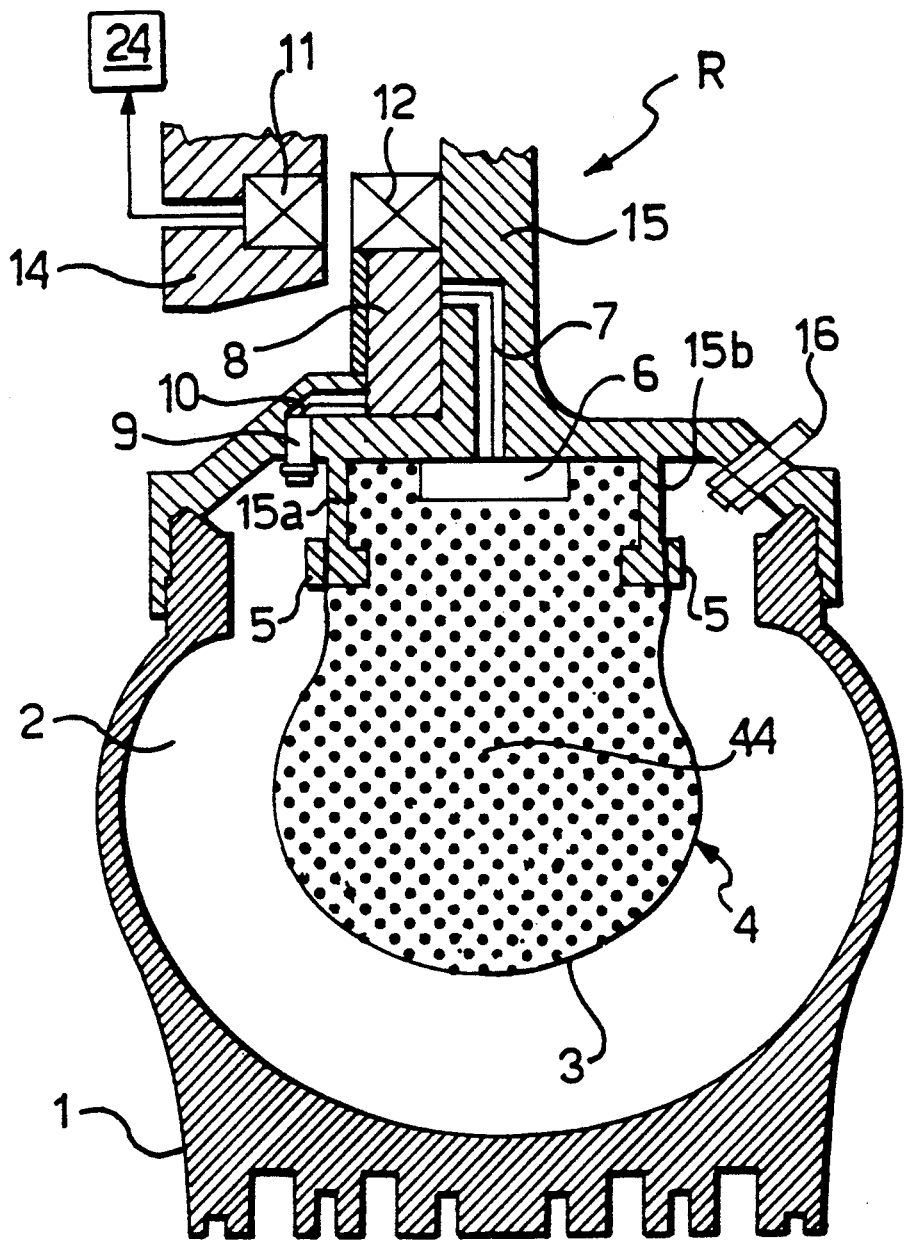
FIG. 1 is a sectional view showing in schematical form a pneumatic tire wheel for vehicles embodying this invention.

FIG. 1, a pneumatic tire wheel for vehicles, generally designated R, is shown to comprise a pneumatic tire 1, known per se, which is mounted to a rim 15. Between the tire 1 and the rim 15, there is defined a tight sealed chamber 2 into which compressed air is normally introduced through an inflation valve 16 affixed to the rim 15.

Two parallel flanges 15a,b extend from the rim 15 to the interior of the chamber 2. An impermeable, elastically deformable envelope 3 is secured on said flanges 15a,b in a tight manner by means of backing flanges 5.

The envelope 3 is formed preferably from a laminated material including a foil of aluminum or an alloy thereof.

Said envelope 3 borders, with the flanges 15a,b and the rim 15, a continuous toric bladder generally indicated at 4.

The bladder 4 contains a two-phase system, such as a volatile liquid in a balanced state with its own vapor at the temperature and inflation pressure of the tire 1, or alternatively, a solid capable of sublimating significantly under said temperature and pressure conditions.

Preferably, a fluid is employed, such as a mixture of water and alcohol, having a boiling temperature within the range of 50° to 100° C. at atmospheric pressure.

Figure 4:
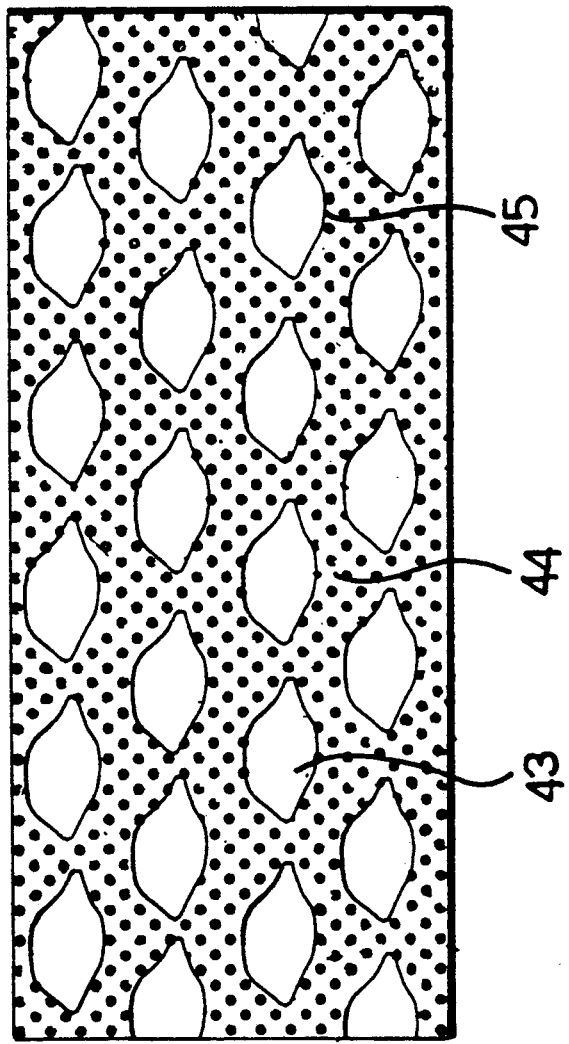
FIG. 4 is an enlarged scale detail view of the wheel shown in FIG. 1.

The fluid would be distributed through a spongy matrix 44, best shown in FIG. 4, which is formed from a heat conductive polymeric material such as polypyrrol.

Through the spongy matrix 44, there are defined plural voids 43 adapted to accommodate the volatile liquid in free form and/or in the form of tiny sealed vesicles, each having an elastically deformable envelope 45.

A peltier-effect thermoelectric element 6, in strip form, extends inside the bladder 4 in thermal contact with the rim 15 of the wheel R. The thermoelectric element 6 is supplied with a DC current and provides a temperature differential across it which results in a transfer of heat between the rim 15 and the bladder 4. By reversing the supply polarity to the thermoelectric element 6, the flow of heat is reversed, to or from the toric bladder 4.

When the flow of current through the thermoelectric element 6 is such as to heat the toric bladder 4, some of the volatile liquid contained therein is caused to change its state, thereby the bladder is expanded and the inflation pressure of the tire 1 increased. On reversing the flow of current through the thermoelectric element 6, thereby the bladder 4 becomes cooler, partial condensation of the volatile liquid contained therein is produced causing its volume to decrease. The inflation pressure of the tire 1 will be reduced accordingly.

The thermoelectric element 6 is connected, via a cable 7, to an electronic unit 8. Connected to that same unit 8 is also a pressure transducer 9 via a cable 10.

The unit 8 and thermoelectric element 6 are powered via first and second electromagnetic couplers, respectively an emitting one 11 and receiving one 12, which are mounted at corresponding locations on the vehicle 14 and the rim 15, respectively.

Figure 2:
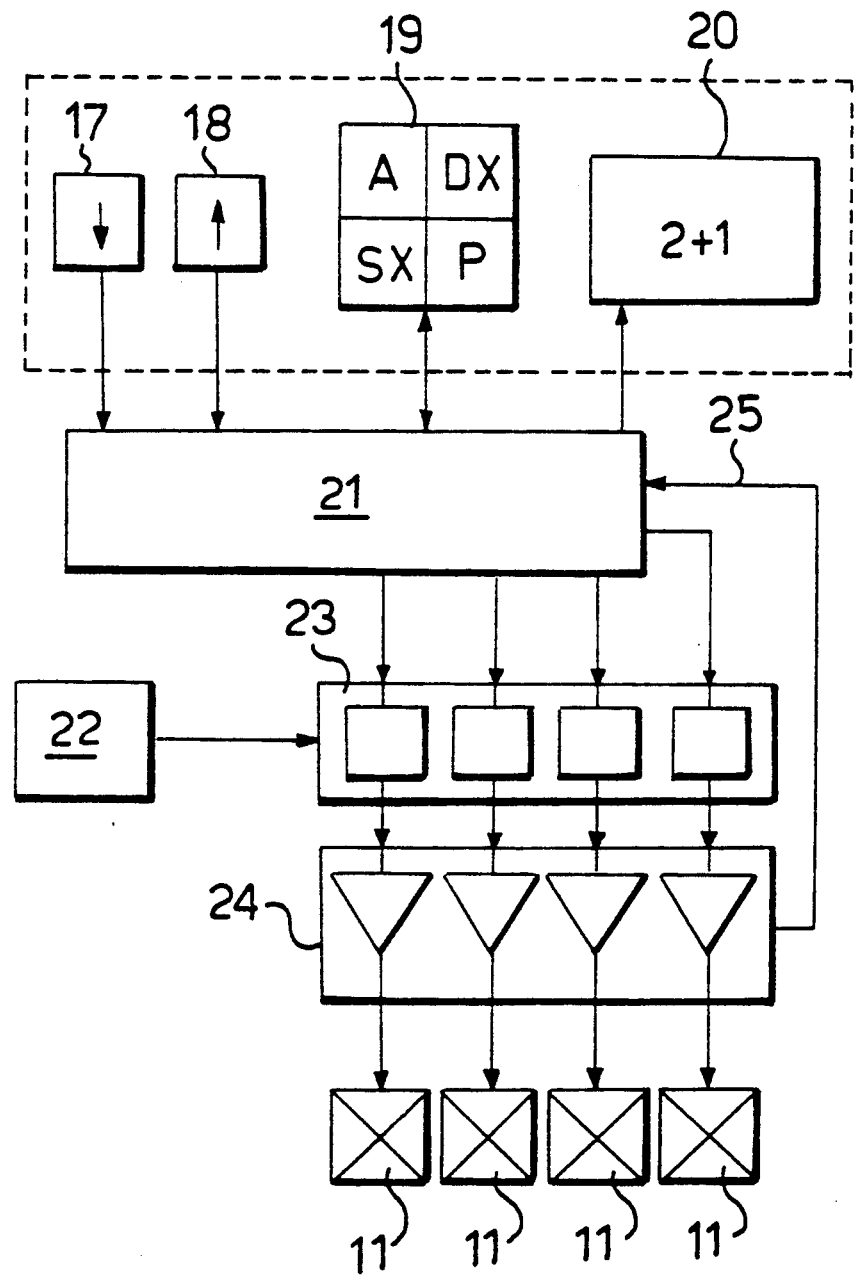
FIG. 2 shows in a block diagram the components provided, according to the invention, on a vehicle for adjusting the inflation pressure of the pneumatic tire wheel in FIG. 1.

With reference to FIG. 2, on the vehicle 14, and preferably the dashboard thereof, there is provided a set 19 of four key switches with light indicators; associated with the set 19 are two additional key switches indicated at 17 and 18, respectively, and a digital display 20.

The switches 17-19 and display 20 are connected electrically in an electronic circuit, schematically indicated at 21.

Said switches 17-19 enable pressure values to be selected, set, and displayed on the display 20, both individually for each wheel R of the vehicle 14 and for groups of wheels R. As an example, in the instance of a four-wheeled vehicle, to change the inflation pressure of the right front wheel, one should depress the keys A and DX in the key set 19 simultaneously, thereby displaying on the display 20 the value of a previously set pressure, and depress either the key 17 or 18 to get a lower or higher pressure value, respectively. By depressing at one time the keys A and P in the key set 19, simultaneous setting is selected of the same pressure value for all four vehicle wheels R.

The newly set pressure value is stored in the electronic circuit 21 upon releasing the key switches 17-19.

Also installed on the vehicle 14 is an oscillator 22 for setting a required carrier for the electromagnetic couplers 11 and 12, as well as a quadruple modulator 23 for modulating the carrier set by the oscillator 22, and a quadruple power driver 24 supplying the emitting electromagnetic couplers 11 related to each wheel.

The electronic circuit 21, whose wiring diagram is not shown because unrelated to this invention, includes a non-volatile memory in which the pressure values set by means of the switches 17-19 are stored. It further drives the displaying of the pressure values on the display 20, sets the control modulation to the quadruple modulator 23, and controls warning signals as follows. The driver 24 includes a circuit for monitoring the power absorbed by each wheel: where the power is below a predetermined minimum, a warning signal is supplied to the electronic circuit 21 on a link 25. Failure of the driver 24 or of a connection or of one or more of the emitting couplers 11 or a malfunction in the adjustment of a tire inflation pressure, all result in a decreased electric power absorption, and hence, in an alert situation.

In an alert situation, the electronic circuit 21 would drive the pair of switches 19 which correspond to the alerted wheel(s) to flash on.

Figure 3:
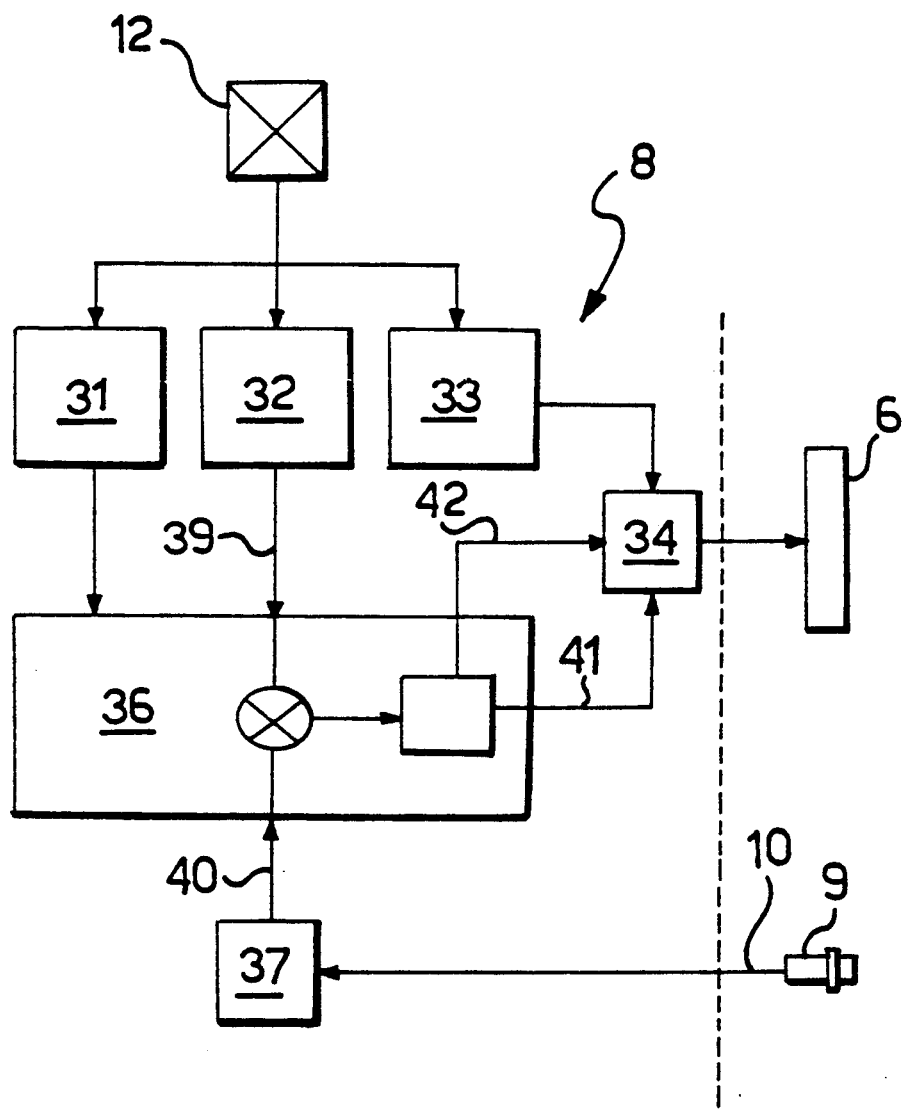
FIG. 3 is a block diagram of a detail of the wheel shown in FIG. 1.

With reference to FIG. 3, the receiving electromagnetic coupler 12 receives the modulated power carrier by the desired pressure value set. Indicated at 31 is a power supply to the electronic unit 8 which, by rectifying the power carrier, will supply DC current at the required voltage.

At 32 there is indicated a means, known per se, of demodulating the power carrier to derive a signal which is proportional to the pressure value sought for a corresponding wheel R.

Indicated at 33 is a power supply effective to derive a DC current from the power carrier to power the Peltier-effect thermoelectric element 6.

Indicated at 34 is a polarity changeover switch associated with the thermoelectric element 6 to change over its supply polarity, and therefore, reverse the flow of current therethrough depending on whether heat is to be delivered to or substracted from the toric bladder 4. It further functions as a power sink through the rim 15 in the event that no change is required in the inflation pressure of the tire 1.

The changeover switch 34 serves the additional function of disconnecting the absorption of electric power in the event of a malfunction occurring in the apparatus associated therewith, or where the pressure setting for the corresponding wheel R is impossible to achieve.

Indicated at 36 is an electronic control-adjustment circuit. The reference numeral 37 denotes a signal processor associated with the pressure transducer 9.

The inflation pressure value set in the memory of the electronic circuit 21 is demodulated by the means 32 and supplied to the electronic circuit 36 over a link 39. The actual pressure value of the tire as detected by the pressure transducer 9 is passed to the electronic circuit 36 via a link 40.

Through a link 41, the electronic control-adjustment circuit 36 drives the polarity changeover switch 34 and through it the Peltier thermoelectric element 6 to either heat or cool the volatile liquid contained in the toric bladder 4, or to keep its heat contents unchanged.

Through a link 42, the electronic control-adjustment circuit 36 warns the polarity changeover switch 34 of any alert situations arising from a malfunction, as recognized through a diagnostic cycle, or from the impossibility to achieve the set pressure value. In the instance of the tire being punctured the condition of a pressure setting being impossible to achieve is communicated as warning signal to the electronic circuit 21 on the vehicle 14, and through that circuit, reported to the vehicle dashboard.

Under normal temperature and pressure conditions, relatively to the inflating specifications for the tire 1, the toric bladder 4 expansion would be average, to provide for corresponding increases or decreases of the tire inflation pressure as its volume increases or decreases.

An electric signal which is proportional to the inflation pressure value detected by the pressure transducer 9 is supplied to the electronic circuit 36 from the unit 8. If the value signified by the transducer 9 corresponds to the setting in the memory of the electronic circuit 21, then the heat contents of the two-phase system is left unaltered. If a difference is found between such values, the thermoelectric element 6 is energized through the polarity changeover switch 34 to either heat or cool the two-phase system until such a difference is brought to zero.

As is known, the balance condition in the presence of saturated vapor of the two-phase system is a function of its temperature and pressure conditions. Accordingly, by delivering heat to the two-phase system, this balance condition is upset and partial vaporization of the liquid or solid phase caused until a new balance condition is struck.

This results in the toric bladder 4 being expanded and the inflation pressure of the tire 1 being increased accordingly.

Conversely, if heat is substracted from the two-phase system, partial condensation of the vapor phase will result to bring about a consequent decrease of the toric bladder 4 volume and ultimate decrease of the tire inflation pressure.

On the occurrence of a puncture to the tire, the inflation pressure in the tight chamber would drop suddenly. Within a very short time, some of the two-phase system would be vaporized to produce a new balance condition to suit the change in pressure.

The pressure drop is also detected by the transducer 9, which would control the thermoelectric element 6 to turn on and deliver heat to the two-phase system.

If, after a predetermined time period, it is found that the inflation pressure cannot be restored within the wheel R as preset through the switches 17–19, then the electronic circuit 21 turns on the flashing feature of the set of switches 19 which correspond to the damaged wheel.

In all cases, the punctured tire deflation rate is slowed up considerably by virtue of the partial pressure compensation provided by the increased volume of the toric bladder 4.

The pneumatic tire wheel of this invention has several additional advantages over conventional like wheels. For example, by subjecting the two-phase system to a pressure increase, some of the vapor will condense and temporarily issue heat which raises the temperature of the pressurized air within the tight chamber. However, the air would expand very little for a temperature change of but few degrees.

This affords improved absorption of the shocks, for example, from the road surface, thus improving also the vehicle running comfort. In fact, once the shock load is removed, the heat energy stored up in the pressurized air will flow back into the bladder to restore the former pressure condition.

Further, by measuring the power input devoted to maintaining a desired pressure within a tire, any alterations occurring to the tire may be detected which could result in a sharp change of the inflation pressure.

Additional advantages are afforded on the occurrence of a tire puncture or blowout. The liquid contained in the toric bladder and/or the sealed vesicles through the spongy matrix would then be vaporized and retard the deflation process. At the same time, the alert situation would be monitored from the vehicle dashboard, and heat added to the two-phase system in order to increase its vapor content and further retard the tire deflation.

Even in the instance of the toric bladder being punctured can the wheel of this invention retain some of its performance by virtue of the sealed vesicles scattered through the spongy matrix and of the heat-conducting properties of the latter.

It is important to observe, moreover, that despite the many advantages afforded by the wheel of this invention, it can be particularly light in weight.

What is claimed is:

1. A wheel for vehicles comprising a tire rim, a pneumatic tire mounted on the tire rim to define a tight sealed chamber between the rim and the pneumatic tire for inflation of said tire, a sealed elastically deformable bladder mounted on the rim in said tight sealed chamber, a predetermined amount of a two-phase system disposed in said bladder, said two-phase system including a liquid and its saturated vapor in balanced condition, and thermoelectric means for selectively changing the amount of heat in said two phase system to control the inflation pressure of the tire.

2. A wheel according to claim 1, further comprising a spongy matrix within said bladder, said two-phase system being at least partly scattered through said spongy matrix.

3. A wheel according to claim 12 wherein said spongy matrix includes a plurality of sealed, elastically deformable vesicles containing a two-phase system and being scattered through said spongy matrix.

4. A wheel according to claim 2 wherein said spongy matrix comprises a heat-conductive material.

5. A wheel according to claim 1, wherein said thermoelectric means is mounted to the rim within said bladder for selectively introducing and removing heat from said bladder.

6. A wheel according to claim 5, wherein said means comprises a Peltier-effect thermoelectric element.

7. A vehicle having a plurality of pneumatic tire wheels and control means for selectively controlling pneumatic pressure in each of said pneumatic tire wheels, each pneumatic tire wheel comprising a tire rim, a pneumatic tire mounted on the tire rim to define a tight sealed chamber between the rim and the pneumatic tire for inflation of said tire, a sealed elastically deformable bladder mounted on the rim in said tight sealed chamber, a predetermined amount of a two-phase system disposed in said bladder, said two-phase system including a liquid and its saturated vapor in balanced condition, and thermoelectric means for selectively changing the amount of heat in said two phase system to control the pneumatic pressure.

8. A vehicle according to claim 7 further comprising, for each wheel, first and second electromagnetic couplers mounted on the vehicle and the wheel, respectively, for powering said thermoelectric means.

9. A vehicle according to claim 8 wherein said control means comprises:
   a pressure transducer associated with the inflation chamber of each wheel and adapted to generate a proportional signal to the value of the pressure within said inflation chamber,
   a means of storing a desired pressure value for each wheel,
   an oscillator adapted to generate a carrier and connected to said first electromagnetic coupler,
   a modulator for modulating said carrier according to the stored pressure value, a polarity changeover switch associated with said thermoelectric means, and
   an electronic circuit mounted to the wheel, connected to the pressure transducer, second electromagnetic coupler, and polarity changeover switch, and adapted to demodulate the carrier induced in the second electromagnetic coupler to derive a proportional signal to the stored pressure value, compare said signal with the value generated by the pressure transducer, and drive, based upon a difference between the signals so compared, said polarity changeover switch.

* * * * *